(12) United States Patent
Edvinsson-Albers et al.

(10) Patent No.: US 7,645,438 B2
(45) Date of Patent: Jan. 12, 2010

(54) PROCESS FOR THE PRODUCTION OF HYDROGEN PEROXIDE

(75) Inventors: Rolf Edvinsson-Albers, Partille (SE); Boris Kuzmanovic, Essen (DE); Cornald Van Strien, Elst (NL)

(73) Assignee: Akzo Nobel N.V., Arnhem (NL)

( * ) Notice: Subject to any disclaimer, the term of this patent is extended or adjusted under 35 U.S.C. 154(b) by 178 days.

(21) Appl. No.: 11/808,556

(22) Filed: Jun. 11, 2007

(65) Prior Publication Data
US 2008/0044343 A1 Feb. 21, 2008

Related U.S. Application Data

(60) Provisional application No. 60/816,617, filed on Jun. 27, 2006.

(51) Int. Cl.
*C01B 15/023* (2006.01)
(52) U.S. Cl. .............. 423/588; 423/590; 423/584; 423/585
(58) Field of Classification Search ............ 423/584, 423/585, 587–590
See application file for complete search history.

(56) References Cited

U.S. PATENT DOCUMENTS

| 3,761,580 | A | * | 9/1973 | Schreyer et al. ............ 423/588 |
|---|---|---|---|---|
| 4,552,748 | A | | 11/1985 | Berglin et al. |
| 4,668,436 | A | | 5/1987 | Sethi |
| 4,824,609 | A | | 4/1989 | Sethi |
| 5,063,043 | A | | 11/1991 | Bengtsson |
| 5,220,106 | A | * | 6/1993 | Boate et al. ............ 585/865 |
| 5,662,878 | A | | 9/1997 | Datta et al. |
| 2007/0193952 | A1 | * | 8/2007 | Maase et al. ............ 210/634 |

FOREIGN PATENT DOCUMENTS

WO WO 01/40150 A1 6/2001

OTHER PUBLICATIONS

Kirk-Othmer, Encyclopedia of Chemical Technology, vol. 13, Hydrogen Peroxide, Online Posting Date Aug. 17, 2001, pp. 1-58.
S. Zhang et al, Extractive Desulfurization and Denitrogenation of Fuels Using Ionic Liquids, Ind. Eng. Chem. Res. 2004, 43, pp. 614-622.
M. Seiler et al, Hyperbranched polymers: new selective solvents for extractive distillation and solvent extraction, Separation and Purification Technology 30 (2003)179-197.

\* cited by examiner

*Primary Examiner*—Melvin C Mayes
*Assistant Examiner*—Melissa Stalder
(74) *Attorney, Agent, or Firm*—Kenyon & Kenyon LLP

(57) ABSTRACT

The invention relates to a process for the production of hydrogen peroxide comprising a liquid-liquid extraction step, said extraction step comprising contacting an organic feed solution containing hydrogen peroxide with an extraction solvent comprising less than about 30 wt % of water to achieve extraction of hydrogen peroxide to said extraction solvent and obtaining an extract containing hydrogen peroxide.

25 Claims, No Drawings

PROCESS FOR THE PRODUCTION OF HYDROGEN PEROXIDE

This application claims priority from U.S. Provisional Application No. 60/816,617, filed on Jun. 27, 2006, the subject matter of which is incorporated herein by reference.

The present invention relates to a process for the production of hydrogen peroxide comprising a liquid-liquid extraction step.

The most common process for production of hydrogen peroxide is the anthraquinone autoxidation process involving alternate hydrogenation and oxidation of one or more anthraquinones or tetrahydro anthraquinones, usually alkyl anthraquinone or alkyl tetrahydro anthraquinone, in a working solution composed of a mixture of organic solvents. The hydrogen peroxide formed is usually recovered by extraction with water to form an aqueous solution. The process is described extensively in the literature, for example in Kirk-Othmer, "Encyclopedia of Chemical Technology", Vol. 13, "Hydrogen Peroxide", Online Posting Date Aug. 17, 2001.

The anthraquinone autoxidation process is very efficient but it is difficult to avoid impurities from the working solution to be extracted together with the hydrogen peroxide. Further, concentrating the aqueous solution of hydrogen peroxide by for example evaporation is energy consuming and accumulates impurities with low volatility, and purification by distillation requires even more energy.

U.S. Pat. No. 3,761,580 discloses production of very pure aqueous hydrogen peroxide solutions by stripping of hydrogen peroxide from the working solution, condensing the resulting vapours containing a mixture of hydrogen peroxide and organic solvents and extracting the condensed vapours to give an aqueous hydrogen peroxide solution.

U.S. Pat. No. 4,824,609 discloses purification of working solution by extraction with carbon dioxide, while U.S. Pat. No. 4,668,436 disclose purification by extraction with a non-cyclic hydrocarbon.

Purification of hydrocarbon fluids by extraction with various ionic liquids has been disclosed in, for example, WO 01/40150 and S. Zhang et al, "Extractive Desulfurization and Denitrogenation of Fuels Using Ionic Liquids", Ind. Eng. Chem. Res. 2004, 43, op. 614-622.

M. Seiler et al, "Hyperbranched polymers: new selective solvents for extractive distillation and solvent extraction", Separation and Purification Technology 30 (2003) 179-197, discloses use of hyper branched polymers for extractive distillation and solvent extraction.

According to the invention it has been found that hydrogen peroxide of high purity can be produced in a process comprising extraction of hydrogen peroxide with a solvent substantially free from or comprising only low amounts of water.

Thus, an aspect of the present invention concerns a process for the production of hydrogen peroxide comprising a liquid-liquid extraction step, said extraction step comprising contacting an organic feed solution containing hydrogen peroxide with an extraction solvent comprising less than about 30 wt % of water to achieve extraction of hydrogen peroxide to said extraction solvent and obtaining an extract containing hydrogen peroxide.

The temperature and pressure at the extraction step are set so the organic feed solution and the extraction solvent are liquid. Usually the temperature is preferably from about 0 to about 120° C., most preferably from about 30 to about 80° C. In most cases the pressure is preferably from about 10 to about 1000 kPa, most preferably from about 100 to about 400 kPa.

The extraction solvent preferably has as low miscibility as possible with the organic feed solution. The miscibility can be characterised with the octanol/water partition coefficient $K_{ow}$ defined as the ratio of a chemical's molar concentration in the 1-octanol phase to its concentration in the aqueous phase of a two-phase 1-octanol/water system at equilibrium. Log $K_{ow}$ at 25° C. and atmospheric pressure for the non-aqueous part of the extraction solvent is preferably below 0, more preferably below −0.5, most preferably below −1 or even below 1.5.

In order to facilitate phase separation at the extraction there is preferably a significant difference in density between the organic feed solution and the of the extraction solvent. As the organic feed solution usually has a comparatively low density, for example from about 850 to about 1200 kg/m³, or from about 920 to about 1050 kg/m³ at 25° C. and atmospheric pressure, the density of the extraction solvent is preferably higher, the upper limit only being set by available solvents. A suitable density at 25° C. and atmospheric pressure may, for example, be at least about 950 kg/m³, for example from about 950 to about 1800 kg/m³, or from about 1050 to about 1300 kg/m³.

In order to facilitate recovery of hydrogen peroxide the non-aqueous part of the extraction solvent preferably has a low volatility. Thus, the vapour pressure at 50° C. is preferably below about 10 kPa, most preferably below about 1 kPa.

The extraction solvent preferably comprises less than about 20, most preferably less than about 10 wt % of water and may even comprise less than about 5 wt % of water or be substantially water free.

In an embodiment the extraction solvent preferably comprises an at least partially organic salt, comprising at least one kind of organic cation and/or organic anion. In this embodiment the content of at least partially organic salt in the extraction solvent is preferably from about 20 to 100 wt %, most preferably from about 50 to 100 wt % or from about 80 to 100 wt %.

In another embodiment the extraction solvent preferably comprises an inorganic salt of high solubility, examples of which include $CsSO_4$, $KNO_3$ and $CsBF_4$. In this embodiment the content of inorganic salt in the extraction solvent is preferably from about 50 to 100 wt %, most preferably from about 70 to 95 wt % or from about 80 to 95 wt %.

In still another embodiment the extraction solvent preferably comprises a dendrimeric structure, having a regular or irregular structure, and being either a dendrimer in which well-defined branches radiate from a central core becoming more branched as they extend to the periphery, or a hyper branched polymer which do not emanate from a central core. The building blocks, particularly the end groups are preferably selected such that the dendrimeric structure becomes soluble in water or another neutral or charged co-solvent with limited miscibility with the organic feed solution. Examples of building blocks include polyglycerol, polyesteramide, esterified polyester, polyamidoamine, poly(alkyl aryl ether), and the hydrophilic end groups —OH or tertiary amine. Other examples include ionic structures such as a phosphoramidothioate backbone containing a suitable counter-ion such as acetate, sulphate, methylsulphate. In this embodiment the content of dendrimeric structures in the extraction solvent is preferably from about 50 to 100 wt %, most preferably from about 80 to about 95 wt %.

The extraction solvent may also comprise a mixture of one or more of partially organic salts, entirely inorganic salts and dendrimic structures.

The extraction solvent may further comprise one or more neutral co-solvents with a high distribution factor defined as the ratio of the concentration in the extraction solvent to the concentration in the organic feed solution. The distribution factor should preferably be higher than about 5, more preferably higher than about 10, most preferably higher than about 20. Examples of such neutral co-solvents include water and lower alcohols such as methanol, ethanol, and dialcohols like ethylene glycol, of which water is preferred. If included, the content of neutral co-solvent is suitably from 0 to about 30 wt %, preferably from 0 to about 20 wt %, most preferably from about 3 to about 10 wt %.

An at least partially organic salt in the extraction solvent may be selected from the group of salts referred to as ionic liquids, a diverse class of liquids substantially consisting of ions and having negligible vapour pressure at room temperature. An ionic liquid can be simple and contain a single kind of anions and a single kind of cations, or may be complex and contain a mixture of different anions and/or different cations. Some ionic liquids have a low melting point near or below room temperature and are often referred to as room temperature ionic liquids. Such ionic liquids usually remain liquids over a large temperature range.

An at least partially organic salt in the extraction solvent may also be selected from salts that alone are not classified as ionic liquids but have suitable properties when present together with a neutral co-solvent such as water.

An extraction solvent with suitable physical properties may comprise one or a mixture of two or more at least partially organic salts, optionally in combination with neutral co-solvents. It may also comprise anions and cations that alone do not form salts with suitable properties.

The at least partially organic salt in the extraction solvent may be formed from various combinations of cations and anions, among which at least one kind of ion is organic. The ions are preferably but not necessarily monovalent. Examples of cations include 1-alkyl-3-methyl imidiazolium such as 1-butyl-3-methyl imidazolium [BMIM] or 1-ethyl-3-methyl imidazolium [EMIM], 1,2,3-trimethyl imidazolium, 1-methyl imidazolium, N-alkylpyridinium, N-butyl pyridinium [BPY], pyrrolidinium, guanidinium, alkyl guanidinium, isouronium, tetramethyl isothiouronium, $PR_4^+$, $SR_3^+$, $NR_4^+$ such as tetramethylammonium, cholinium, or cocomonium, and mixtures thereof, R preferably being, independently of each other, optionally substituted alkyl, alkenyl or aryl, or hydrogen. Other examples include substituted quinones here denoted [Q-NR$_3^+$] and [Q-PR$_3^+$], where Q represents a quinone such as anthraquinone, naphtoquinone or benzoquinones and R being as above. Examples of anions include hexafluorophosphate [HFP], tetrafluoroborate [TFB], fluorosulphonate, hexafluoroantimonate hexafluoroarsenate, chloroaluminate, bromoaluminate, bis(trifluoromethylsulphonyl) imide, tris(trifluoromethylsulphonyl)methide, tricyanomethide, dicyanamide, nonafluorobutanesulphonate, trifluoromethane sulphonate, 2,2,2-trifluororethanesulphonate, nitrate, sulphate, hydrogen sulphate, phosphate, $RPO_4^{2-}$, $R_2PO_4^-$, $R_2PO_2^-$ (e.g. a dialkylphosphinate), perchlorate, acetate, alkylsulphonate, bis(2-ethylhexyl)sodium sulphosuccinate, diethyleneglycolmonomethylethersulphate, alkyloligoethersultfate, pivalate, tetraalkylborate, propionate, succinate, saccharinate, glycolate, stearate, lactate, malate, tartrate, citrate, ascorbate, glutamate, benzoate, salicylate, methanesulphonate, toluenesulphonate, and mixtures thereof, R preferably being as above. Other examples include substituted quinones here denoted [Q-(O)-SO$_3^-$] and [Q-(O)-PO$_3$R$^-$], where Q represents a quinone such as anthraquinone, naphtoquinone or benzoquinones, (O) denotes an optional oxygen (e.g. sulphate/sulphonate and phosphate/phosphonate) and R being as above.

The at least partially organic salt may be also formed from inorganic cations, such as alkali metals such as Na, K, Rb, Cs in combination with an organic anions such as formate, acetate, propionate, salicylate. Specific combinations are cesium acetate, cesium formate and cesium salicylate.

In case any cation or anion comprise one or more optionally substituted alkyl, alkenyl or aryl groups, it is preferred that these groups, independently from each others, have from 1 to 12 carbon atoms, most preferably from 1 to 8 carbon atoms. If more than one such group is present, they are preferably of mixed chain length. Alkyl, alkenyl and aryl groups may also be substituted, e.g. with one or more hydroxyl group.

Examples of salts useful for the present invention include any combination of the following cations; [1,3-dialkyl imidazolium] such as [1-ethyl-3-methyl imidazolium], [1-butyl-3-methyl-imidazolium], [1,3-diethyl-imidazolium] or [1,3-dimethyl-imidazolium], [1-monoalkyl imidazolium] such as [1-methyl imidazolium], [1,2,3-trialkyl-imidazolium] such as [1,2,3-methyl-imidazolium] or [1-butyl-2-ethyl-3-methyl-imidazolium], [trialkylammonium], [tetraalkylammonium] such as [cholinium] or [tris-(2-hydroxyethyl)-methyl-ammonium], [trialkylphosphonium], [tetraalkylphosphonium] such as [triisobutyl-methyl-phosphonium], [tetraalkyl isothiouronium] such as [tetramethyl isothiouronium], [alkylpyridinium] such as [N-Butyl pyridinium], [dialkylpyridinium] such as [N-butyl-3-methyl-pyridinium], [dialkylpyrrolidinium] such as [1-butyl-1-methyl-pyrrolidinium], [Pentaalkyl-guanidinium] such as [N"-ethyl-N,N,N',N'-tetramethyl-guanidinium], [Pentaalkyl-isouronium] such as [O-Ethyl-N,N,N',N'-tetramethyl-isouronium] or [O-Methyl-N,N,N',N'-tetramethyl-isouronium], [tetraalkyl-isouronium] such as [tetramethyl-isouronium] [Q-NR$_3^+$] and [Q-PR$_3^+$], in combination with any of the following anions; [sulphate], [hydrogen sulphate], [phosphate], [alkyl sulphate] such as [methyl sulphate] or [ethyl sulphate], [alkyl sulphonate] such as [methanesulphonate] or [trifluoromethane sulphonate] [dialkyl phosphate] such as [diethylphosphate], [alkyl phosphonate], [saccharinate], [acesulphamate], [tetrafluoroborate], [tosylate], [acetate], [trifluoroacetate], [thiocyanate][dicyanamide] [Q-(O)—SO$_3^-$] and [Q-(O)—PO$_3$R$^-$], where Q, (O) and R are defined as above.

Specific combinations of groups include [1,3-dialkyl imidazolium] [alkyl sulphonate] such as any one of [1-butyl-3-methyl-imidazolium][trifluoromethanesulphonate], [1-ethyl-3-methyl-imidazolium][methanesulphonate], [1,3-dialkyl imidazolium] [alkyl sulphate] such as [1-butyl-3-methyl-imidazolium][methylsulphate] or [1-ethyl-3-methyl-imidazolium][methylsulphate], [1,3-dialkyl imidazolium] [tetrafluoroborate] such as [1-butyl-3-methyl-imidazolium][tetrafluoroborate] or [1-ethyl-3-methyl-imidazolium][tetrafluoroborate]. [tetraalkyl ammonium] [alkylsulphonate] such as any one of [methyl, tri-ethyl ammonium], N,N,N-(methyl,diethyl)][methylsulphonate];.

Other specific combinations include any one of [1-methyl imidazolium][hydrogen sulphate]; [choline][saccharinate]; 2,4,4-trimethylpentyl phosphinate] [tetrabutylammonium] [methanesulphonate][1-ethyl-3-methyl imidazolium], [triphentyl sulphonium][dipentyl, benzyl ammonium], [, [N-propyl-pyridinium][saccharinate], [tris-(2-hydroxyethyl)-methyl-ammonium][methylsulphate], [cholinium] [salicylate], [methyl-imidazolium] [hydrogen sulphate], [1-butyl-3-methyl-imidazolium][thiocyanate], [1-ethyl-3-methyl-imidazolium] [thiocyanate], [1-ethyl-3-methyl-imidazolium][ethylsulphate], [1-butyl-3-methyl-imidazolium- 2-(2-methoxy)][ethylsulphate]. [1-ethyl-3-methyl-imidazolium-2-(2-methoxy)][ethylsulphate], [1-ethyl-3-methyl-imidazolium][bis(pentafluoroethyl)phosphinate], [1-ethyl-3-methyl-imidazolium][ethylsulphate], [1-ethyl-3-methyl-imidazolium][diethylphosfate], [1-ethyl-3-methyl-imidazolium][dicyanamide], [1-butyl-3-methyl-imidazolium][dicyanamide], [N-butylpyridinium][tetrafluorobrate], [1-ethyl-3-methyl-imidazolium][tetrafluoroborate], [cholinium][saccharinate], [cholinium][acesulphamate], [tri-isobutyl-methyl-phosphonium][tosylate], [O-methyl-N,N,N',N'-tetramethylisouronium][trifluoromethanesulphonate], [O-ethyl-N,N,N',N'-tetramethylisouronium][trifluoromethanesulphonate], N"-ethyl-N,N,N',N'-tetramethylguanidinium][trifluoromethanesulphonate], [1-butyl-1-methylpyrrolidinium][trifluoromethanesulphonate], [N-butyl-3-methylpyridinium][methylsulphate] [N-butylpyridinium][tetrafluoroborate], [1-butyl-2,3-dimethyl-imidazolium][tetrafluoroborate], [methyl-imidazolium][hydrogensulphate], [1-ethyl-3-methyl-imidazolium][tosylate], [1-ethyl-3-methyl-imidazolium][thiocyanate][1-butyl-3-methyl-imidazolium][dicyanamide]

Some salts that have been found efficient include 1-methylimidazolium hydrogen sulphate, tetramethyl isothiouronium trifluoro methane sulphonate, choline saccharinate, and mixtures thereof.

In addition to those mentioned above, also other kinds of commercially available or otherwise known ionic liquids or salts having such properties in combination with a neutral co-solvent may be used.

The extraction solvent may also include further components such as hydrogen peroxide stabilisers, emulsifiers, corrosion inhibitors, anti-foaming agents, buffers, viscosity reducers, etc. Examples of hydrogen peroxide stabilisers include those commonly used such as phosphoric acid, phosphonic acid based complexing agents, protective colloids like alkali metal stannate and radical scavengers like pyridine carboxylic acids. Examples of phosphonic acid based complexing agents include 1hydroxyethylidene-1,1-diphosphonic acid, 1-aminoethane-1,1-diphosphonic acid, aminotri (methylenephosphonic acid), ethylene diamine tetra (methylenephosphonic acid), hexamethylene diamine tetra (methylenephosphonic acid), diethylenetriamine penta (methylenephosphonic acid), diethylenetriamine hexa (methylenephosphonic acid), 1-aminoalkane-1,1-diphosphonic acids (such as morpholinomethane diphosphonic acid, N,N-dimethyl aminodimethyl diphosphonic acid, aminomethyl diphosphonic acid), reaction products and salts thereof, preferably sodium salts. For optimal stability the pH is preferably from about −1 to about 10, more preferably from about −1 to about 7, most preferably from about 0 to about 5.

The liquid-liquid extraction of hydrogen peroxide from the organic feed solution may be performed by any method using any equipment suitable therefore that is known in the art. Examples include various types of extraction columns, mixer-settlers, centrifugal or special extractors. Columns include, for example, random or structured packed columns, baffle plate columns, sieve plate or tray columns, pulsed packed or perforated plate columns, Karr (reciprocating plate) extraction columns, RDC (rotating disc contactor) columns, Oldshue Rushton columns, Scheiberl columns, Kuhni columns and Greasser (raining bucket) columns. Other kinds of extraction equipment include combined mixer settlers, pump mixer settlers, Lurgi mixer settlers, Podbielniak centrifugal extractors, Alfa laval centrifugal extractors, Westfalia extractors, hydrocyclones, Eries Rotabel extractors, non dispersive extractors, hollow fibre extractors and extractors with impregnated MPP (macro porous polymer) particles.

The extract containing hydrogen peroxide may be uses as such. Examples of such use include epoxidation of alkenes such as propene for production of propene oxide, preparation of peracids such as peracetic acid or preparation of peroxy salts such as sodium percarbonate.

However, the process may also comprises a step of recovery of hydrogen peroxide from the extract to obtain, for example, an aqueous or non-aqueous solution of hydrogen peroxide, a substantially dry gas of hydrogen peroxide and optionally one or more inert gases, or solid particles on which hydrogen peroxide is adsorbed. The recovery may be performed by various standard unit operations such as evaporation, extraction, adsorption or membrane-based technologies. After recovery of hydrogen peroxide, the remaining extraction solvent may be recycled to the liquid-liquid extraction step, optionally with an intermediate purification to avoid accumulation of impurities originating from the organic feed solution, such as degradation products formed in a working solution of an autoxidation process or metal ions. Examples of purification treatments include anion and/or cation exchange, washing with solvents such as higher alcohols, evaporation/stripping at high temperatures, preferably above 100° C., treatment with acids or caustic, and crystallization.

Recovery of hydrogen peroxide by evaporation may be effected by stripping with any inert gas such as oxygen, air, nitrogen or off-gases from the oxidation stage in an autoxidation process, optionally after removal of solvent vapours using, for example. adsorption on activated carbon. Recovery of hydrogen peroxide by evaporation may also be effected by distillation at atmospheric or sub-atmospheric pressure, for example a pressure from about 0.1 to about 100 kPa, preferably from about 1 to about 30 kPa, and preferably at a temperature below about 100° C. or below about 80° C. Due to the low volatility of salts or hyper branched polymers preferably constituting the main part of the extraction solvent, hydrogen peroxide of high purity can be evaporated with relatively low energy consumption, optionally together with water present in the extraction solvent. If necessary, extra water may be added to dilute the hydrogen peroxide to a safe concentration, usually from about 20 to about 75 wt %.

Examples of membrane-based technologies for recovery of hydrogen peroxide include membrane extraction, pervaporation and nanofiltration.

The invention can be applied to all processes for the production of hydrogen peroxide in which an organic solution of hydrogen peroxide is obtained, such as autoxidation processes, direct syntheses from hydrogen and oxygen in an organic reaction medium or electrochemical processes, optionally involving electrochemical reduction of a mediator followed by oxidation thereof to obtain hydrogen peroxide. The remaining organic feed solution obtained after the liquid-liquid extraction, i.e. the raffinate, may in most cases be recycled to the process steps in which the hydrogen peroxide actually is formed.

The invention is particularly advantageous in a quinone autoxidation process for the production of hydrogen peroxide. Thus, a further aspect of the invention concerns a process for the production of hydrogen peroxide comprising the steps of hydrogenating quinones in a working solution, oxidising hydrogenated quinones in said working solution to obtain hydrogen peroxide, and extracting and optionally recovering hydrogen peroxide from said working solution, the extraction and optional recovery being performed as described above with the working solution constituting the organic feed solution containing hydrogen peroxide.

The working solution to be hydrogenated in such a process comprises one or more kinds of quinones, examples of which include molecules containing a (benzo)quinone-moiety (orto- or para-forms), of which anthraquinones, tetrahydro anthraquinones, naphtoquinones, benzoquinones and derivates thereof are preferred. Anthraquinones, naphtoquinones and benzoquinones are preferably substituted, for example alkyl substituted like 2-alkyl-9,10-anthraquinones or 2-alkyl-1,4-naphtoquinones. Specific examples include 2-ethyl-9,10-anthraquinone, 2-tert-butyl-9,10-anthraquinone, 2-hexenyl-9,10-anthraquinone, eutectic mixtures of alkyl-9,10-anthraquinones, mixtures of 2-amyl-9,10-anthraquinones, all of which having high stability. Specific examples of alkyl substituted napthoquinones include 2-methyl-1,4-naphthoquinone, 2-ethyl-1,4-naphthoquinone, 2-propyl-1,4-naphthoquinone, 2-tert-butyl-1,4-naphthoquinone, 2-tert-amyl-1,4-naphthoquinone, 2-iso-amyl-1,4-naphthoquinone, 2,3-dimethyl-1,4-naphthoquinone.

In case a quinone is substituted and comprise one or more optionally substituted alkyl, alkenyl or aryl groups, it is preferred that these groups independently from each others, have from 1 to 12 carbon atoms, most preferably from 1 to 8 carbon atoms. If more than one such group is present, they are preferably of mixed chain length.

In case of naphtoquinones or anthraquinones being used, the working solution usually also comprises the corresponding quinones with the lateral rings partially hydrogenated, such as 1,2,3,4-tetrahydro anthraquinone, 5,6,7,8-tetrahydro-2-ethyl-anthraquinone or 5,6,7,8-tetrahydronaphtoquinone.

The total amount of quinones in the working solution to be hydrogenated is preferably from about 5 to about 30 wt % most preferably from about 10 to about 20 wt %.

The working solution preferably comprises a mixture of one or more quinone solvents and one or more hydroquinone solvents. Suitable quinone solvents may include aromatic, aliphatic or naphtenic hydrocarbons, for example benzene, alkylated or polyalkylated benzenes such as tert-butylbenzene or trimethyl benzene, alkylated toluene or naphthalene such as tert-butyltoluene or methylnaphthalene. Suitable hydroquinone solvents may include alkyl phosphates (e.g. trioctyl phosphate), alkyl phosphonates, alkyl-cyclohexanol esters, N,N-dialkyl carbonamides, tetraalkyl ureas (e.g. tetrabutyl urea), N-alkyl-2-pyrrolidones and high boiling alcohols, preferably with 8-9 carbon atoms (e.g. di-isobutyl carbinol). Examples of preferred hydroquinone solvents include alkyl phosphates, tetraalkyl ureas, cyclic urea derivatives and alkyl-substituted caprolactams.

The hydrogenation of quinones is normally performed by contacting the working solution with hydrogen gas in the presence of a catalyst at a suitable temperature, for example from about 0 to about 100° C., preferably from about 40 to about 85° C., and at a suitable pressure, for example an absolute pressure from about 100 to about 1500 kPa, preferably from about 200 to about 600 kPa. The degree of hydrogenation (as moles hydroquinones per $m^3$ working solution) is preferably from about 250 to about 800, most preferably from about 350 to about 600.

The active catalyst may, for example, be a metal selected from any of nickel, palladium, platinum, rhodium, ruthenium, gold, silver, or mixtures thereof. Preferred metals are palladium, platinum and gold, of which palladium or mixtures comprising at least 50 wt % palladium are particularly preferred. The active catalyst may be in free form, e.g. palladium black suspended in the working solution, or be deposited on a solid support such as particles used in the form of a slurry, a fixed bed or a monolithic support, for example, as described in U.S. Pat. Nos. 4,552,748 and 5,063,043. Preferred support materials are selected from silica or aluminium oxide.

Oxidation of hydrogenated quinones to obtain hydrogen peroxide can be performed in any conventional way as described in the literature, such as contacting the working solution with gaseous oxygen or oxygen containing gas such as air that may or may not be oxygen enriched. The contact may be effected in any kind of vessel or column with co-current or counter-current flow. The oxidation results in a working solution comprising dissolved hydrogen peroxide, preferably in an amount from about 8 to about 27 $kg/m^3$, most preferably from about 10 to about 20 $kg/m^3$. This working solution constitutes the organic feed solution containing hydrogen peroxide in the following liquid-liquid extraction step that is performed as earlier described. The raffinate, may then be recycled to the hydrogenation step as conventional in autoxidation processes.

In a particular embodiment the oxidation and extraction may be performed in the same vessel or column.

Other steps in the overall process of producing hydrogen peroxide, such as working solution regenerations etc., may be performed in conventional manner as described in the literature.

The present invention involves several advantages compared to conventional processes in which hydrogen peroxide is extracted with water. Particularly, it is possible to produce hydrogen peroxide of high purity without extensive and energy consuming after-treatments. Further, using an extraction solvent of high density enables use of a working solution of higher density, for example having higher amount of quinones. Moreover, using an extraction solvent with a favourable distribution ratio for hydrogen peroxide enables extraction at a low solvent to feed ratio.

The invention will now be further described through the following examples which, however, not should be interpreted as limiting the scope thereof. Unless otherwise stated, all parts and percentages refer to parts and percent by weight.

EXAMPLE 1

Preparation of Choline Saccharinate 1080 g of sodium saccharinate hydrate (99%, e.g. Acros) was mixed with 732 g of solid choline chloride (99%, e.g. Acros), using 6 l of acetone as the solvent. After 8 hours of agitating, allowing for ion exchange reaction to take place, the formed suspension was filtered. The filtrate was subjected to evaporation in a Rotavap at a temperature of about 60° C. and minimal pressure of about 40 mbar until no further evaporation of the solvent was observed. The remaining product was a liquid confirmed by elemental chemical composition analysis (chloride, sodium and sulphur concentration) to be choline saccharinate. The water content was determined to be 5 wt %.

EXAMPLE 2

Test of Distribution Ratio

To evaluate the suitability for the use in extraction from an non-polar organic solvent, the hydrophilic properties of an ionic liquid was quantified by measuring the equilibrium distribution ratio between water and 1-octanol, defined as the ratio of the ionic liquid concentration (in g/l) in water to the one in 1-octanol.

1.8 g of the ionic liquid 1-methylimidazolium hydrogen sulphate (e.g. Fluka, purity>95%) was dissolved in 23 g of water. That aqueous solution was mixed with 25 g of 1-octanol (e.g. Fluka, ~98%) at room temperature, shaken for 8 hours and left to settle for 20 hours in a closed vessel. Samples of both the liquid layers formed were taken and analyzed. The concentration of ionic liquid was determined by measuring the concentration of sulphur in the samples. The distribution ratio of 1-methylimidazolium hydrogen sulphate between water and 1-octanol was determined to be $1 \cdot 10^3$.

1.8 g of the ionic liquid 1-ethyl-3-methylimidazolium trifluoromethane sulphonate (e.g. Merck) was dissolved in 23 g of water. That aqueous solution was mixed with 23 g of 1-octanol at room temperature. The mixture was treated, sampled and concentration of ionic liquid measured as already described above. The distribution ratio of 1-ethyl-3-methylimidazolium trifluoromethanesulphonate between water and 1-octanol was found to be $5 \cdot 10^1$.

EXAMPLE 3

Extraction of Hydrogen Peroxide from xylene/1-octanol

An organic feed solution containing 3 g/l of hydrogen peroxide was prepared by mixing o-xylene (e.g. Fluka, purity>99%) and 1-octanol in 5:1 weight ratio, with a 30 wt % aqueous solution of hydrogen peroxide (e.g. Fluka) in a weight ratio of 10:1 and separating the organic and aqueous phases. Liquid-liquid extraction of hydrogen peroxide from the organic feed solution into 1-methylimidazolium hydrogen sulphate ionic liquid (density 1.48 kg/m$^3$) as extraction solvent was performed by mixing the organic feed solution and the extraction solvent in 1:1 weight ratio. The mixture was shaken rigorously for two hours and settled for at least five hours to ensure that equilibrium was reached between a lower phase of extract (based on ionic liquid) and an upper phase of raffinate (remaining organic feed solution). The concentration of the hydrogen peroxide in both phases was determined by titration with a potassium permanganate. The same procedure was done with 1-ethyl-3-methyl imidazolium trifluoromethane sulphonate (density 1.39 kg/m) and with choline saccharinate containing 5 wt % water (density 1.26 kg/m$^3$), respectively, as extraction solvents. The results, including the distribution ratios of hydrogen peroxide between the extract and the raffinate, are shown in the table below:

| Extraction solvent | Temp. | $H_2O_2$ in raffinate (g/l) | $H_2O_2$ in extract (g/l) | Distribution ratio of $H_2O_2$ |
|---|---|---|---|---|
| 1-methylimidazolium hydrogen sulphate | room temp. | $3.0 \cdot 10^{-2}$ | 2.9 | 97 |
| 1-ethyl-3-methylimidazolium trifluoromethane sulphonate | room temp. | $3.9 \cdot 10^{-2}$ | 3.4 | 87 |
| Choline saccharinate (contains 5 wt % water) | 50° C. | $2.8 \cdot 10^{-2}$ | 3.0 | 105 |

EXAMPLE 4

Extraction of Hydrogen Peroxide from a Working Solution

The same procedure as described in Example 3 was applied, but instead of an o-xylene/1-octanol mixture the organic feed solution consisted of a multicomponent mixture of aromatic and aliphatic hydrocarbons used as a working solution in an anthraquinone autoxidation process and comprising a mixture of ethyl and amyl anthraquinones and the corresponding tetrahydroalkylanthraquinones and a mixture of C9-C11 alkylbenzenes and tetrabutylurea as main components. The concentration of the hydrogen peroxide in the feed solutions varied from batch to batch and was between 6 and 9 g/l. Extraction of hydrogen peroxide from the organic feed solutions into 1-methylimidazolium hydrogen sulphate, choline saccharinate, 1-ethyl-3-methylimidazolium trifluoromethane sulphonate and tetramethyl isothiouronium trifluoromethane sulphonate (density 1.34 kg/m$^3$) (e.g. Merck) were performed at 50° C. in the same way as described in Example 1. The loss of extraction solvent was measured by determining the concentration thereof in the raffinate. The results are shown in the following table.

| Extraction solvent | $H_2O_2$ in feed (g/l) | $H_2O_2$ in raffinate (g/l) | $H_2O_2$ in extract (g/l) | Distribution ratio of $H_2O_2$ | Extraction solvent in raffinate (wt %) |
|---|---|---|---|---|---|
| 1-methylimidazolium hydrogen sulphate | 6.3 | $2.7 \cdot 10^{-1}$ | 9.7 | 36 | 0.4 |
| 1-ethyl-3-methylimidazolium trifluoromethane sulphonate | 5.7 | $3.7 \cdot 10^{-1}$ | 9.8 | 27 | 0.1 |
| Tetramethyl isothiouronium trifluoromethane sulphonate | 7.9 | $2.2 \cdot 10^{-1}$ | 7.7 | 35 | 0.04 |
| Choline saccharinate (incl. 5 wt % water) | 5.7 | $1.8 \cdot 10^{-1}$ | 7.2 | 40 | 0.03 |

EXAMPLE 5

Comparative, Extraction with Water

The procedure of Example 3 was repeated but with water as extraction solvent (at room temperature). The equilibrium concentrations of hydrogen peroxide were determined to 2.9 g/l in the extract and 0.029 g/l in the raffinate, giving a distribution ratio of 99.

EXAMPLE 6

Comparative, Extraction with Water

The procedure of Example 4 was repeated but with water as extraction solvent. The concentration of hydrogen peroxide in the organic feed solution was 6.5 g/l, while the equilibrium concentrations of hydrogen peroxide were determined to 6.3 g/l in the extract and 0.33 g/l in the raffinate, giving a distribution ratio of 19.

EXAMPLE 7

Recovery of Hydrogen Peroxide

To verify the possibility of recovering hydrogen peroxide by evaporation, a solution of choline saccharinate containing 20 wt % water was equilibrated with a working solution as specified in Example 4 to give a hydrogen peroxide content in the extract of 6.35 g/l. For safety reasons this extract was diluted with water to a water content of 50 wt % and was then fed to a rotary evaporator operated at 8.5-9 kPa and 55-62° C. The evaporated part of the extract was condensed and collected and after 50 minutes the condensate contained 47% of the hydrogen peroxide initially present in the extract.

The same procedure was repeated with 1-methylimidazolium hydrogen sulphate containing 5 wt % water to give hydrogen peroxide content in the extract of 3.1 g/l. After 60 minutes operation of the rotary evaporator the condensate contained 97% of the peroxide initially present in the extract, indicating complete substantially recovery.

The invention claimed is:

1. Process for the production of hydrogen peroxide comprising a liquid-liquid extraction step, said extraction step comprising contacting an organic feed solution containing hydrogen peroxide with an extraction solvent comprising less than about 30 wt % of water to achieve extraction of hydrogen peroxide to said extraction solvent and obtaining an extract containing hydrogen peroxide.

2. Process as claimed in claim 1, wherein the density of the extraction solvent is from about 950 to about 1800 kg/m³.

3. Process as claimed in claim 1, wherein log $K_{ow}$ at 25° C. and atmospheric pressure for the non-aqueous part of the extraction solvent is below 0.

4. Process as claimed in claim 1, wherein the vapour pressure of non-aqueous part of the extraction solvent at 50° C. is below about 10 kPa.

5. Process as claimed in claim 1, wherein the extraction solvent comprises an at least partially organic salt comprising at least one kind of organic cation and/or organic anion.

6. Process as claimed in claim 5, wherein the content of at least partially organic salt in the extraction solvent is from about 50 wt % to 100 wt %.

7. Process as claimed in claim 5, wherein the at least partially organic salt comprises a cation selected from the group consisting of 1-alkyl-3-methyl imidiazolium, 1,2,3-trimethyl imidazolium, 1-methyl imidazolium, N-alkylpyridinium, N-butyl pyridinum, pyrrolidinium, guanidinium, alkyl guanidinium, isouronium, tetramethyl isothiouronium, $PR_4^+$, $SR_3^+$, $NR_4^+$, and mixtures thereof, R being, independently of each other, optionally substituted alkyl, alkenyl or aryl, or hydrogen.

8. Process as claimed in claim 5, wherein the at least partially organic salt comprises an anion selected from the group consisting of hexafluorophosphate, tetrafluoroborate, fluorosulphonate, hexafluoroantimonate hexafluoroarsenate, chloroaluminate, bromoaluminate, bis(trifluoromethylsulphonyl)imide, tris(trifluoromethylsulphonyl)methide, tricyanomethide, dicyanamide, nonafluorobutanesulphonate, trifluoromethane sulphonate, 2,2,2-trifluororethanesulphonate, nitrate, sulphate, hydrogen sulphate, phosphate, $RPO_4^{2-}$, $R_2PO^{4-}$, $R_2PO_2^-$, perchlorate, actetate, alkylsulphonate, bis(2-ethylhexyl)sodium sulphosuccinate, diethyleneglycolmonomethylethersulphate, alkyloligoethersultfate, pivalate, tetraalkylborate, propionate, succinate, saccharinate, glycolate, stearate, lactate, malate, tartrate, citrate, ascorbate, glutamate, benzoate, salicylate, methanesulphonate, toluenesulphonate, and mixtures thereof, R being, independently of each other, optionally substituted alkyl, alkenyl or aryl, or hydrogen.

9. Process as claimed in claim 7, wherein the at least partially organic salt is selected from the group consisting of 1-methylimidazolium hydrogen sulphate, 1-ethyl-3-methylimidazolium trifluoromethane sulphonate, tetramethyl isothiouronium trifluoro methane sulphonate, choline saccharinate, and mixtures thereof.

10. Process as claimed in claim 1, wherein the extraction solvent comprises a dendrimeric structure.

11. Process as claimed in claim 1, wherein the process further comprises a step of recovery of hydrogen peroxide from the extract.

12. Process as claimed in claim 11, wherein hydrogen peroxide is recovered from the extract by evaporation.

13. Process for the production of hydrogen peroxide comprising the steps of hydrogenating quinones in a working solution, oxidising hydrogenated quinones in said working solution to obtain hydrogen peroxide, and extracting hydrogen peroxide from said working solution, said extraction being a liquid-liquid extraction step and step comprising contacting the working solution containing hydrogen peroxide with an extraction solvent comprising less than about 30 wt % of water to achieve extraction of hydrogen peroxide to said extraction solvent and obtaining an extract containing hydrogen peroxide.

14. Process as claimed in claim 13, wherein the density of the extraction solvent is from about 950 to about 1800 kg/m$^3$.

15. Process as claimed in claim 13, wherein log $K_{ow}$ at 25° C. and atmospheric pressure for the non-aqueous part of the extraction solvent is below 0.

16. Process as claimed in claim 13, wherein the vapour pressure of non-aqueous part of the extraction solvent at 50° C. is below about 10 kPa.

17. Process as claimed in claim 13, wherein the extraction solvent comprises an at least partially organic salt comprising at least one kind of organic cation and/or organic anion.

18. Process as claimed in claim 17, wherein the content of at least partially organic salt in the extraction solvent is from about 50 wt % to 100 wt %.

19. Process as claimed in claim 17, wherein the at least partially organic salt comprises a cation selected from the group consisting of 1-alkyl-3-methyl imidiazolium, 1,2,3-trimethyl imidazolium, 1-methyl imidazolium, N-alkylpyridinium, N-butyl pyridinium, pyrrolidinium, guanidinium, alkyl guanidinium, isouronium, tetramethyl isothiouronium, $PR_4^+$, $SR_3^+$, $NR_4^+$, and mixtures thereof, R being, independently of each other, optionally substituted alkyl, alkenyl or aryl, or hydrogen.

20. Process as claimed in claim 17, wherein the at least partially organic salt comprises an anion selected from the group consisting of hexafluorophosphate, tetrafluoroborate, fluorosulphonate, hexafluoroantimonate hexafluoroarsenate, chloroaluminate, bromoaluminate, bis(trifluoromethylsulphonyl)imide, tris(trifluoromethylsulphonyl)methide, tricyanomethide, dicyanamide, nonafluorobutanesulphonate, trifluoromethane sulphonate, 2,2,2-trifluororethanesulphonate, nitrate, sulphate, hydrogen sulphate, phosphate, $RPO_4^{2-}$, $R2PO_4^-$, $R_2PO_2^-$, perchlorate, actetate, alkylsulphonate, bis(2-ethylhexyl)sodium sulphosuccinate, diethyleneglycolmonomethylethersulphate, alkyloligoethersultfate, pivalate, tetraalkylborate, propionate, succinate, saccharinate, glycolate, stearate, lactate, malate, tartrate, citrate, ascorbate, glutamate, benzoate, salicylate, methanesulphonate, toluenesulphonate, and mixtures thereof, R being, independently of each other, optionally substituted alkyl, alkenyl or aryl, or hydrogen.

21. Process as claimed in claim 19, wherein the at least partially organic salt is selected from the group consisting of 1-methylimidazolium hydrogen sulphate, 1-ethyl-3-methylimidazolium trifluoromethane sulphonate, tetramethyl isothiouronium trifluoro methane sulphonate, choline saccharinate, and mixtures thereof.

22. Process as claimed in claim 20, wherein the at least partially organic salt is selected from the group consisting of 1-methylimidazolium hydrogen sulphate, 1-ethyl-3-methylimidazolium trifluoromethane sulphonate, tetramethyl isothiouronium trifluoro methane sulphonate, choline saccharinate, and mixtures thereof.

23. Process as claimed in claim 13, wherein the extraction solvent comprises a dendrimeric structure.

24. Process as claimed in claim 13, wherein the process further comprises a step of recovery of hydrogen peroxide from the extract.

25. Process as claimed in claim 13, wherein hydrogen peroxide is recovered from the extract by evaporation.

* * * * *